United States Patent [19]

Hooper et al.

[11] Patent Number: 4,805,762
[45] Date of Patent: Feb. 21, 1989

[54] RECIPROCATING DISCHARGER

[75] Inventors: Anthony W. Hooper, Montreal; Andre Martel, Fleurimont, both of Canada

[73] Assignee: Uniweld, Inc., Montreal, Canada

[21] Appl. No.: 163,009

[22] Filed: Mar. 2, 1988

Related U.S. Application Data

[63] Continuation-in-part of Ser. No. 913,472, Sep. 30, 1986, Pat. No. 4,763,777.

[51] Int. Cl.⁴ .............................................. B65G 25/08
[52] U.S. Cl. ................................. 198/747; 198/741; 414/306
[58] Field of Search ............... 198/737, 741, 747; 414/304, 306, 325, 509, 512, 513, 516, 517

[56] References Cited

U.S. PATENT DOCUMENTS

| | | | |
|---|---|---|---|
| 1,837,994 | 12/1931 | Preston | 198/747 |
| 2,511,332 | 6/1950 | Denison | 198/741 |
| 3,525,446 | 8/1970 | Grafstrom | 414/525 R |
| 3,828,920 | 8/1974 | Becker | 198/741 |
| 3,923,149 | 12/1975 | Stearns | 198/747 |
| 4,157,761 | 6/1979 | Debor | 414/304 |

FOREIGN PATENT DOCUMENTS

| | | | |
|---|---|---|---|
| 97979 | 8/1979 | Japan | 198/741 |
| 908695 | 3/1982 | U.S.S.R. | 198/741 |

OTHER PUBLICATIONS

Hooper SR Discharger Brochure 1982.
Eaton Hydrostatic Transmissions Model 25 Brochure 10-400, 1/1984.

Primary Examiner—Frank E. Werner
Assistant Examiner—Janice Krizek
Attorney, Agent, or Firm—Larson & Taylor

[57] ABSTRACT

A reciprocating discharger for discharging solid materials from the underside of a pile, has at least one reciprocating stoker rod with a piston at one end connected to a piston rod reciprocating in a stationary cylinder which is mounted on a thrust member frame. The frame has a width greater than the length of a piston stroke, so that the piston rod does not extend outside the frame, thus the solid materials in the pile do not contact the piston rod. A hydraulic system is provided for the cylinder with a hydraulic oil reservoir, an integral power unit with an electric motor directly coupled to a variable flow, reversible piston type pump connected in a closed loop hydraulic circuit with the cylinder, and an automatic reverse arrangement to reverse flow of hydraulic oil to the cylinder after each stroke.

9 Claims, 6 Drawing Sheets

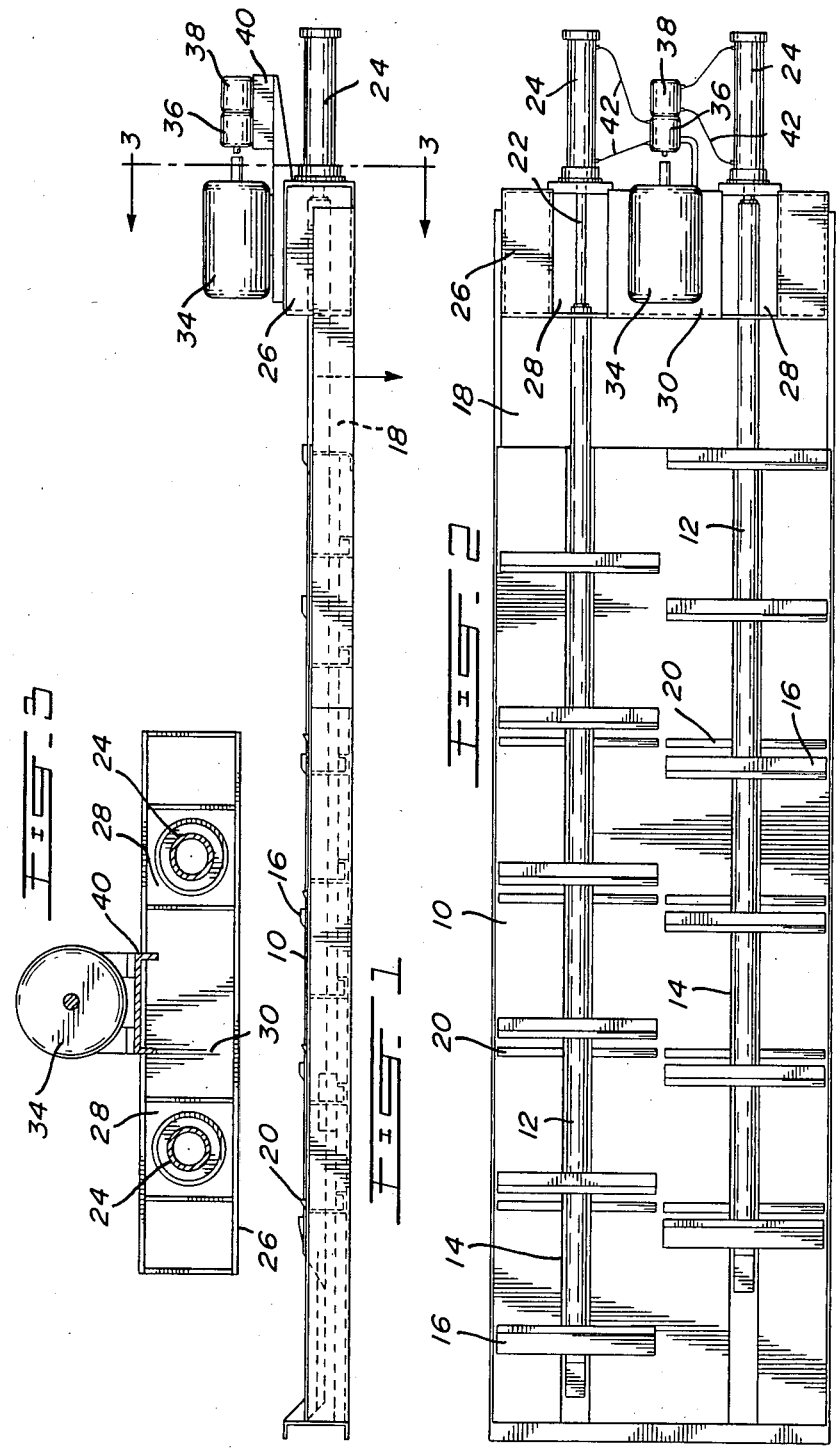

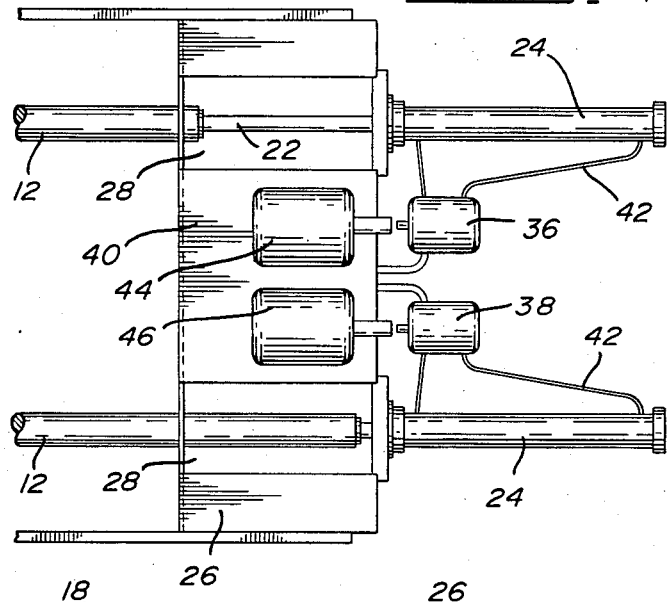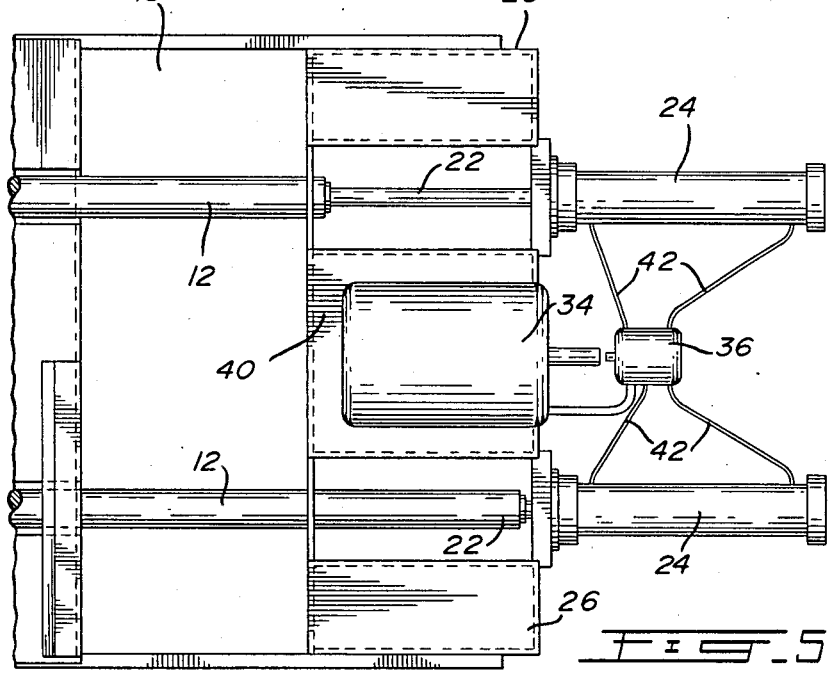

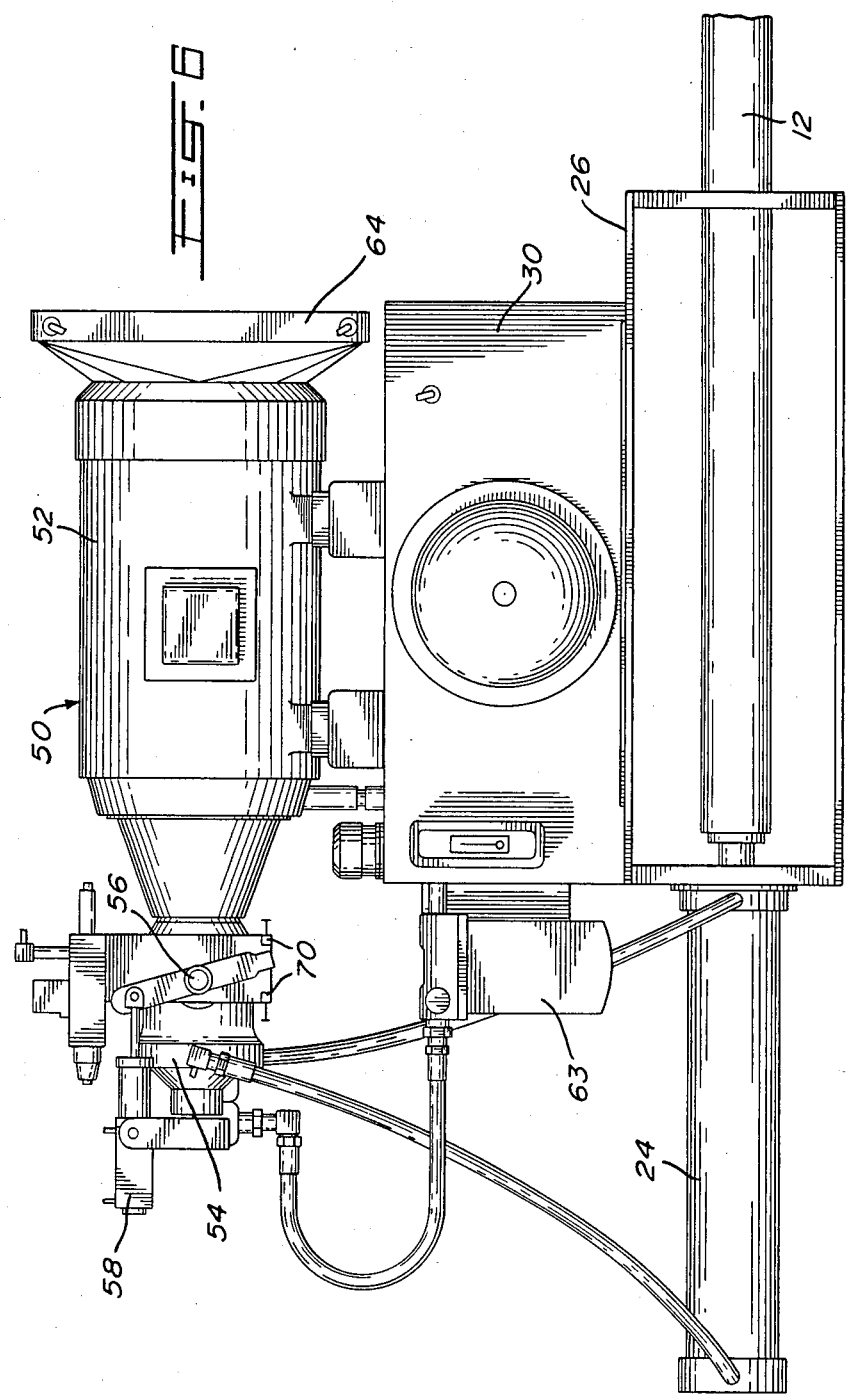

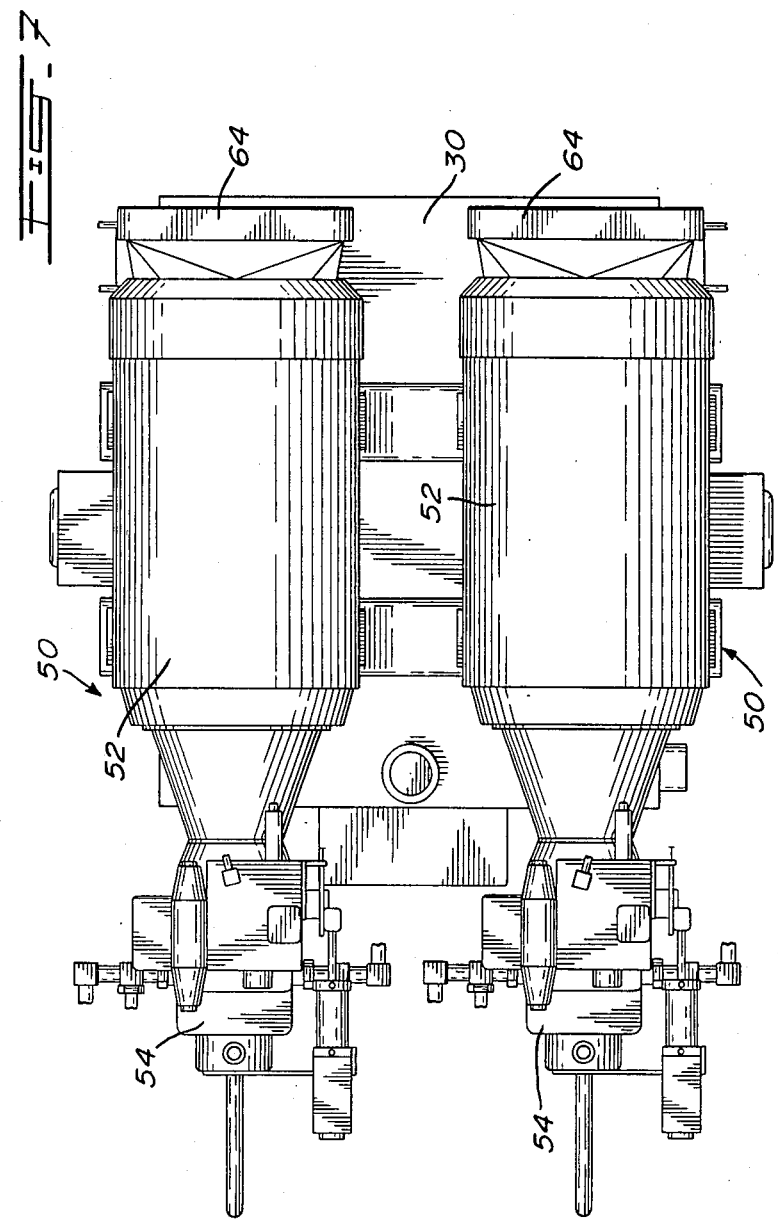

RECIPROCATING DISCHARGER

This application is a continuation-in-part application of Ser. No. 913,472 filed Sept. 30, 1986, now U.S. Pat. No. 4,763,777.

The present invention relates to a discharger for discharging solid materials from the underside of a pile. More specifically, the present invention provides a discharger which utilizes at least one reciprocating stoker rod with a piston at one end connected to a piston rod reciprocating in a stationary cylinder. The stationary cylinder is mounted on a thrust member frame which may form part of a bin or hopper.

Dischargers which are sometimes referred to as feeder mechanisms or stoker mechanisms may be installed on a floor or flat surface for discharging solid materials into a conveyor. Such materials include granular materials, pellets, chips, and all types of particulate materials that can be piled or placed in bins or hoppers. Bark or wood chips are stored in piles at paper mills. The stoker mechanisms are sometimes mounted on the floor or a hopper or bin. One example of a stoker discharger mechanism is shown in U.S. Pat. No. 4,157,761 to Debor. This discharger has at least two parallel stoker rods which each reciprocate under the pile. Each stoker rod has a series of cross bars which push or pull the material towards a discharge outlet. The stoker rod has a piston rod connected at one end of a piston which reciprocates in a fixed cylinder. The cylinder is mounted on a thrust member positioned at one side of the floor or base beneath the pile.

The discharge outlet from a discharger mechanism may be located at almost any position along the stoker rod. One common location is at the end of the stoker rod adjacent the cylinder. In this location, the piston rod passes through the discharge outlet as it reciprocates in the cylinder. Thus discharging material comes in contact with the piston rod which can cause a problem if dust or other material sticks to the rod and is then drawn past the seal into the cylinder.

The present invention provides a thrust member frame which is wider than the stroke of the piston rod, and thus the piston rod itself does not enter into the area where material is being discharged. Furthermore, by providing a wide thrust member frame, there is space in the frame which can be used for a hydraulic reservoir. This allows a power unit to be mounted either adjacent one stoker assembly or between two stoker assemblies, without the necessity of having to have long runs of hydraulic hoses or pipelines and thus providing a compact self contained unit.

It is an aim of the present invention to provide an improved discharger assembly having at least one reciprocating stoker rod with a piston rod connected to a piston reciprocating in a cylinder at one end with the piston rod protected so that it does not enter the area where material is stored or discharged. It is a further aim to provide a power unit integral with a hydraulic reservoir built into a thrust member frame supporting the cylinder. It is a still further aim to provide a service opening in the thrust member frame to allow the piston rod and cylinder assembly to be disconnected and removed without having to remove the stoker rod, and without having to enter the bin or disturb the pile.

The present invention provides in a discharger assembly for discharging solid materials from the underside of a pile including at least one stoker rod extending beneath the pile, a thrust member fixedly mounted adjacent one end of the stoker rod, a stationary cylinder mounted on the outer face of the thrust member, a piston reciprocating within said cylinder connected to a piston rod, the piston rod being in alignment with the stoker rod and having the inner end thereof connected to the end of the stoker rod, the thrust member including a frame having a width greater than the length of the piston rod whereby the piston rod does not extend outside the frame during reciprocation thereof to prevent exposure of the piston rod to the discharging solid materials.

In another embodiment of the invention there is provided in a discharger assembly for discharging solid materials from a floor of a bin or hopper including at least two adjacent stoker rods extending on the floor of the bin or hopper, a thrust member fixedly mounted to said hopper, a pair of stationary cylinders mounted in parallel relationship on the outer face of the thrust member, a piston reciprocating within each cylinder connected to a piston rod, each of the piston rods being in alignment with one of the stoker rods and the inner ends of the piston rods being connected to the ends of the stoker rods, the thrust member including a frame having a width greater than the length of the stroke of the piston rods whereby the piston rods do not extend outside the frame during reciprocation thereof to prevent exposure of the piston rods to discharging solid materials.

In a still further embodiment a hydraulic system is provided for the stationary cylinder comprising a hydraulic oil reservoir positioned above the thrust member, an integral hydraulic power unit mounted on top of the hydraulic oil reservoir with an electric motor directly coupled to a variable flow, reversible piston type pump connected to a closed loop hydraulic circuit with the cylinder and an automatic reversing means to reverse flow of hydraulic oil to the cylinder after each stroke.

In other embodiments a power unit is integral with a hydraulic reservoir in the thrust member frame and the power unit is mounted on the thrust member frame for the cylinder or cylinders.

In drawings which illustrate embodiments of the invention:

FIG. 1 is a side elevational view of a stoker discharger according to one embodiment of the invention;

FIG. 2 is a top elevational view of the stoker discharger shown in FIG. 1;

FIG. 3 is a cross sectional view taken at line 3—3 of FIG. 1;

FIG. 4 is a partial top plan view showing another embodiment of a power unit for the stoker discharger;

FIG. 5 is a partial top plan view showing yet a further embodiment of a power unit;

FIG. 6 is a partial side view showing a power unit similar to that shown in FIG. 4;

FIG. 7 is a plan view of the power unit of FIG. 6;

Figure 8:
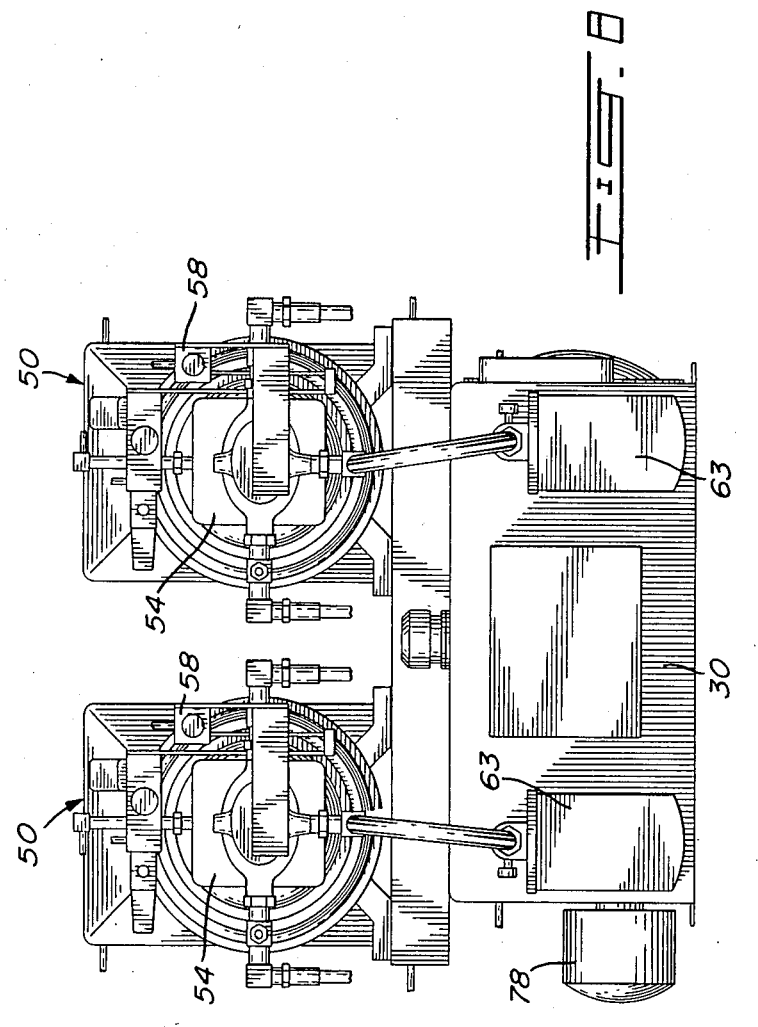
FIG. 8 is an end view of the power unit of FIG. 6.

The reciprocating discharger illustrated in the drawings has two stoker rod assemblies. In some applications, the adjacent stoker rod assemblies reciprocate out of phase one with another, and in other applications, the adjacent stoker rod assemblies reciprocate completely independently. Whereas two discharger rods are shown, one is feasible in certain circumstances and the present invention is applicable to one or more stoker rods.

As shown in FIGS. 1 to 3, a flat base 10 or a floor of a hopper, or the bottom of a pile has two stoker rods 12 which reciprocate in a trough or cavity 14 in the floor 10. Each stoker rod 12 has a series of cross bars 16 attached to it. The cross bars 16 have a wedge shaped cross section with a substantially vertical surface facing towards a discharge outlet 18. Fixed floor angles 20 are provided firmly attached to the floor 10 and parallel to the cross bars 16. The floor angles 20 act to prevent the solid material from backing up when the cross bars 16 are on the return stroke from the discharge stroke. Further details of the reciprocating mechanism are illustrated in U.S. Pat. No. 4,157,761.

The discharge outlet 18 is shown at one end of the discharger. One end of each stoker rod 12 is connected to a piston rod 22 which reciprocates from a piston in a cylinder 24. Both cylinders 24 are stationary and side by side substantially parallel to each other. The cylinders 24 are firmly attached to a thrust member frame 26. In one embodiment, the cylinders 24 are flange mounted on the outboard surface of the thrust member frame 26 as shown in the drawings. The frame 26 is constructed of steel plate and has a width that exceeds the stroke of the piston rod 22. The frame 26 has sufficient structural strength to hold the cylinders 24 in place, and for this reason, is attached rigidly to the floor 10. Openings are provided on the inside wall of the frame 26 for the reciprocating rods 12 to pass backwards and forwards. However, the piston rod 22 which enters the cylinder 24 does not enter the area where material is stored. Furthermore, discharged material passing to the outlet 18 does not contact the piston rod 22 because no material is permitted to pass into the frame 26.

On the top of the frame 26 is an opening 28 above each stoker rod 12 so that the piston rod 22 can be serviced by cleaning and, if necessary, the cylinder 24 and piston rod 22 removed without removing the stoker rod 12. Inside the thrust member frame 26 between the service openings 28 is a space which is used as a hydraulic oil reservoir 30.

As shown in FIG. 1, a motor 34 is mounted on top of the thrust member frame 26 above the reservoir 30 and has the drive shaft connected to two pumps 36 and 38. The pumps 36, and 38 may be mounted directly to the motor itself, or onto a motor base plate 40 as shown in FIG. 1. The pumps 36 and 38 and motor 34 form a power unit integral with the hydraulic reservoir 30 in the thrust member frame 26. Hoses 42 from the hydraulic reservoir 30 supply hydraulic fluid to the pumps which in turn supply fluid to the cylinders 24. The hoses 42 are short, which eliminates pressure drops and pressure shocks which can occur in long runs of hose or pipe. The instrumentation for the power unit may be mounted on the front plate of the thrust member frame 26, and includes level indicators for the reservoir and pressure indicators, together with other controls and indicators as needed.

FIGS. 1 to 3 show a power unit which utilizes one motor connected by a single shaft to two pump units 36 and 38. The two pump units are in line and coupled together. FIG. 4 shows another embodiment wherein the two pump units 36 and 38 have two separate motors 44 and 46. Thus each pump has its individual motor in this embodiment. It is appreciated that in this arrangement, one discharger unit may be run independently of the other discharger unit if desired.

FIG. 5 shows a single motor 34 connected to a single pump 36 with piping or hoses 42 to each cylinder 24. Control valves (not shown) may be mounted on the front face of the frame 26, on the pump 36, or the cylinder 24 to control the flow of hydraulic fluid to the required cylinder 24 such that the piston rods 22 reciprocate.

The power unit shown in FIGS. 6 to 9 is a preferred embodiment similar to that illustrated in FIG. 4 where one integral motor and pump 50 are provided for each cylinder 24. A hydraulic oil reservoir 30 is mounted by bolts on top of the thrust member frame 26. It is positioned substantially midway between the two cylinders 24. A single speed electric motor 52 is directly coupled to a variable flow reversible piston type pump 54. One such example of a suitable variable displacement pump is that sold by Eaton Corporation, Model 25 PV. The output flow from the pump is proportional to the stroke of a plurality of pistons arranged about a central axis to reciprocate axially. Each piston is guided by a swash plate which rotates around a horizontal shaft 56. The angle of the swash plate affects the stroke of each piston and thus the output flow of the pump. The swash plate is mounted on a horizontal shaft 56 as shown in FIG. 6 by a control actuator 58. When the swash plate is vertical, the stroke of the pistons is zero and there is no flow out of the pump. When the angle of the swash plate is maximum on one side, the flow is also maximum on one side of the pump. When the angle is changed to the maximum on the other side, the flow changes to maximum on the other side. Thus you have a flow that changes from one direction to the other which is used in the operation of the piston rod 22 in the cylinder 24 to move the stoker rod 12.

Figure 9:
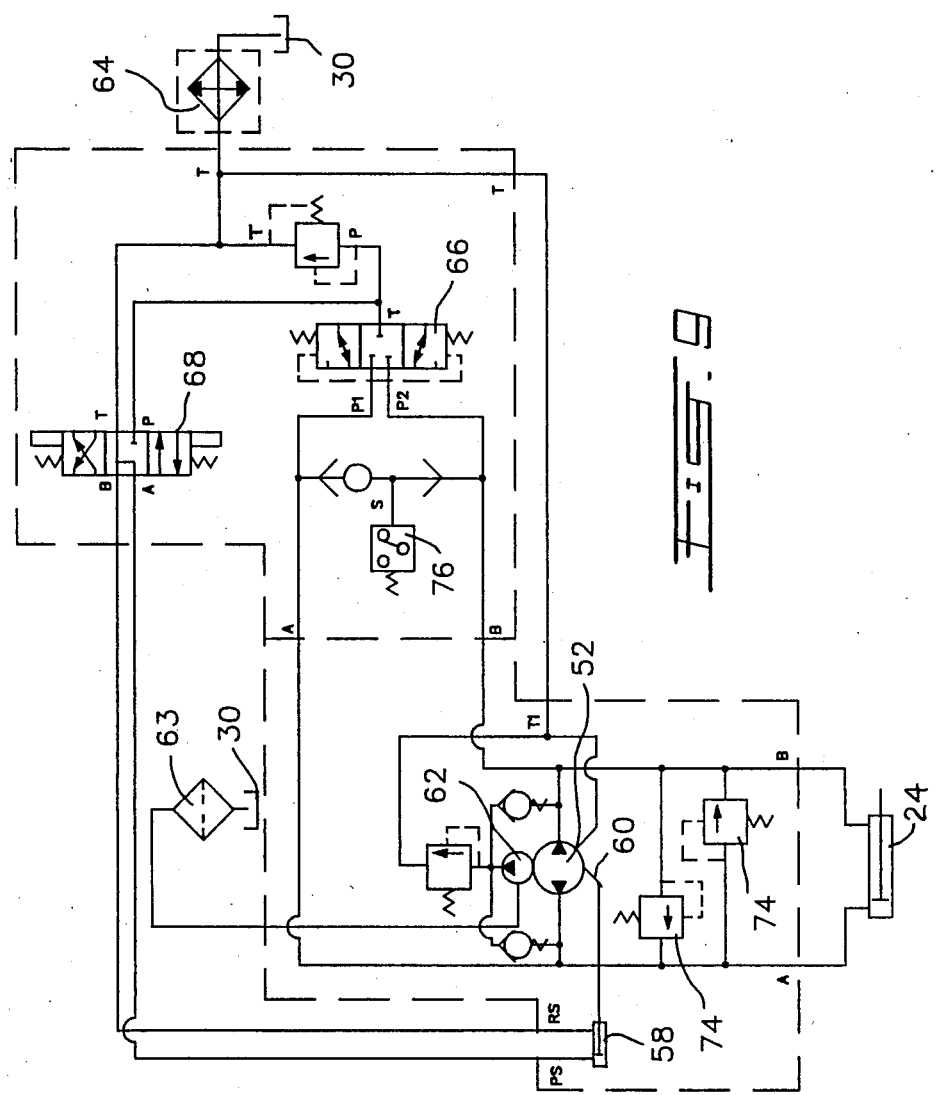
FIG. 9 is a schematic hydraulic diagram for one pump and cylinder according to the power unit of FIG 6.

The hydraulic system incorporating the pump 54 and cylinder 24 is a closed loop system and as illustrated in the schematic hydraulic diagram of FIG. 9, hydraulic oil from the cylinder 24 is passed directly from the return line, whichever side it may be, to the pump 52 wherein it is then pumped to the opposing line. Thus unlike an open loop where one has to suck oil directly from a reservoir and deliver it to a cylinder while emptying oil from the other side of the cylinder back into the reservoir again, one is able to utilize the same oil and thus can have a smaller reservoir. The swash plate 60 as shown in FIG. 9 transfers the flow from one side of the pump to the other thus changing the direction of movement for the stoker rod 12. A charge pump 62, which is a small pump included with the swash plate pump, compensates for internal leakage of the system or for volume differences of the piston side versus the rod side of the cylinder. The charge pump 62 pumps oil from the reservoir 30 to pressurize it, through a suction filter 63 and into the main pump suction side. The excess oil from the charge pump is sent back to the reservoir and in the embodiment shown, passes through a cooler 64 which is mounted on the back of the motor 52 and from here returns to the reservoir 30.

As the capacity of the charge pump 62 is only about 25% that of the main pump, the reservoir 30 for a closed loop circuit is only one quarter that required for an open loop system.

A limit switch (not shown) is provided when the stoker rod 12 reaches the end of its stroke and a signal is sent to the pump actuator 58 to change the position of the swash plate 60 so that the flow is reversed. The swash plate passes through the vertical position which is zero flow before going to maximum flow on the other side and this gives a smooth reversal with no hydraulic shocks.

In the embodiment shown in FIG. 9, the actuator 58 is powered by hydraulic oil from the charge pump 62 through two control valves 66 and 68 which are electrically operated from the limit switch. As shown in FIG. 6, mechanical stoppers 70 on the swash plate toggle connected to the swash plate shaft 56 can be adjusted to vary the flow from the pump.

High pressure relief valves 74 are provided in the closed loop circuit to prevent build up of pressure in the loop and a high pressure safety switch 76 is also provided with electrical contacts to turn off the motor should the pressure in the control system rise above a preset amount.

In one embodiment the reservoir 30 has an electrical immersion heater 78 to maintain the hydraulic oil at a workable temperature in cold climates. The embodiment described herein shows the actuator 58 for the swash plate 60 being hydraulically operated, however, in another embodiment it may be electrically operated, thus linked directly to a signal from the limit switch. In the embodiment shown, there are no external parts to the hydraulic system, removal of the motor which is connected to the top of the hydraulic reservoir 30 by means of bolts removes the complete hydraulic unit and it is only necessary to disconnect the hoses to the reservoir and to the cylinder 24 together with disconnection of the electrical leads for the motor and from the limit switch controlling the stroke. Thus the complete unit may be removed.

In one embodiment an electrical interlock is provided with the signal from the limit switch so that the stoker rods in the pair of cylinders reciprocate out of phase with each other.

Whereas a hydraulic cylinder has been described herein, it is feasible that other suitable mechanical reciprocating devices may be used, however, one of the keys is ensuring that the piston rod 22 does not become exposed to the material in the bin or hopper. I n the case of a hydraulic unit, by putting the reservoir for the hydraulic fluid in the thrust member frame, considerable reduction in pipe and hose runs is attained which reduces pressure drops and shock of long pipe runs. Furthermore, it is practical to have one pump per cylinder which is advantageous.

In the embodiments shown, the hydraulic cylinder is connected at one end of the stoker rod 12. However, in another embodiment there may be a hydraulic cylinder at each end of the stoker rod 12. This allows smaller cylinders or lower hydraulic pressure to be used.

Various changes may be made to the embodiments described herein without departing from the scope of the present invention which is limited only by the following claims.

The embodiments of the invention in which an exclusive property or priviledge is claimed are defined as follows:

1. In a discharger assembly for discharging solid materials from the underside of a pile including at least one stoker rod extending beneath the pile, a thrust member fixedly mounted adjacent one end of the stoker rod, a stationary hydraulic cylinder mounted on the outer face of said thrust member remote from the stoker rod, a piston reciprocating within said cylinder connected to a piston rod, said piston rod being in adjoining alignment with said stoker rod and having the inner end thereof directly connected to the one end of said stoker rod, said thrust member including a frame having a width greater than the length of the stroke of the piston rod whereby the piston rod does not extend outside the frame during reciprocation thereof to prevent exposure of the piston rod to the discharging solid material, a hydraulic system for said stationary hydraulic cylinder comprising:

a hydraulic oil reservoir positioned above the thrust member, an integral hydraulic power unit mounted on top of the hydraulic oil reservoir with an electric motor directly coupled to a variable flow, reversible piston type pump connected in a closed loop hydraulic circuit with the cylinder, and an automatic reversing means to reverse flow of hydraulic oil to the cylinder after each stroke.

2. The discharger assembly according to claim 1 wherein the pump is a swash plate type pump where the flow of hydraulic oil to the cylinder is reversed with no hydraulic shocks, and including a charge pump for the closed loop circuit to compensate for internal oil leakage and volume differential between piston side and rod side of the cylinder.

3. The discharger assembly according to claim 2 including a limit switch means activated when the stoker rod has completed each stroke, and an actuator means operative on a signal from the limit switch means to change the position of a pump swash plate to reverse hydraulic oil flow to the cylinder.

4. The discharger assembly according to claim 3 wherein the actuator means is powered by hydraulic oil from the charge pump.

5. The discharger assembly according to claim 1 including a heater in the hydraulic oil reservoir.

6. In a discharger assembly for discharging solid materials from a floor of a hopper including at least two adjacent stoker rods extending along the length of the floor of the hopper, a thrust member fixedly mounted to said hopper, a pair of stationary hydraulic cylinders mounted in parallel relationship on the outer face of said thrust member outside the hopper, a piston reciprocating within each said cylinder connected to a piston rod, each of said piston rods being in adjoining alignment with one of said stoker rods and the inner ends of said piston rods being directly connected to the ends of said stoker rods, said thrust member including a frame having a width greater than the length of the stroke of the piston rods whereby the piston rods do not extend outside the frame during reciprocation thereof to prevent exposure of the piston rods to discharging solid materials, an individual hydraulic system for each of the pair of stationary hydraulic cylinders comprising:

a hydraulic oil reservoir positioned above the thrust member between the pair of cylinders, an integral hydraulic power unit for each cylinder, both units mounted on top of the hydraulic oil reservoir with an electric motor directly coupled to a variable flow, reversible piston type pump connected in a closed loop hydraulic circuit with each cylinder, and an automatic reversing means for each cylinder to reverse flow of hydraulic oil to each cylinder after each stroke.

7. The discharger assembly according to claim 6 wherein the pump is a swash plate type pump where the flow of hydraulic oil to the cylinder is reversed with no hydraulic shocks, and including a charge pump for the closed loop circuit to compensate for internal oil leakage and volume differential between piston side and rod side of the cylinder.

8. The discharger assembly according to claim 7 including a limit switch means activated when the stoker rod has completed each stroke, and an actuator means operative on a signal from the limit switch means to change the position of a pump swash plate to reverse hydraulic oil flow to the cylinder.

9. The discharger assembly according to claim 6 including an electrical interlock means so that the stoker rods in the pair of cylinders reciprocate out of phase with each other.

* * * * *